United States Patent
Stedman et al.

(10) Patent No.: US 9,268,479 B2
(45) Date of Patent: Feb. 23, 2016

(54) MOTION SENSOR-ENHANCED TOUCH SCREEN

(75) Inventors: Roy W. Stedman, Austin, TX (US); Charles D. Hood, III, Cedar Park, TX (US)

(73) Assignee: Dell Products, LP, Round Rock, TX (US)

(*) Notice: Subject to any disclaimer, the term of this patent is extended or adjusted under 35 U.S.C. 154(b) by 459 days.

(21) Appl. No.: 13/010,914

(22) Filed: Jan. 21, 2011

(65) Prior Publication Data

US 2012/0188170 A1   Jul. 26, 2012

(51) Int. Cl.
| | | |
|---|---|---|
| G06F 3/041 | (2006.01) | |
| G09G 5/00 | (2006.01) | |
| G06F 17/30 | (2006.01) | |
| G06F 3/0488 | (2013.01) | |
| G06F 1/16 | (2006.01) | |
| G06F 3/0346 | (2013.01) | |

(52) U.S. Cl.
CPC ............ G06F 3/0488 (2013.01); G06F 1/1626 (2013.01); G06F 3/0346 (2013.01); G06F 3/0414 (2013.01); G06F 3/0418 (2013.01)

(58) Field of Classification Search
CPC .. G06F 3/04886; G06F 3/0414; G06F 3/0481
USPC ........................ 345/173, 158, 419; 361/679.4; 455/414.3, 566; 701/532; 709/203; 715/810; 726/2
See application file for complete search history.

(56) References Cited

U.S. PATENT DOCUMENTS

| | | | |
|---|---|---|---|
| 6,459,424 B1 * | 10/2002 | Resman | G06F 3/044 345/173 |
| 6,798,429 B2 | 9/2004 | Bradski | |
| 8,140,126 B2 * | 3/2012 | Choi | 455/566 |
| 2006/0184523 A1 * | 8/2006 | Israel | G06F 17/30864 |
| 2006/0279548 A1 * | 12/2006 | Geaghan | G06F 3/0416 345/173 |
| 2007/0075965 A1 | 4/2007 | Huppi et al. | |
| 2007/0097151 A1 * | 5/2007 | Rosenberg | G06F 1/1626 345/660 |
| 2008/0048980 A1 | 2/2008 | Love et al. | |
| 2008/0084384 A1 | 4/2008 | Gregorio et al. | |
| 2008/0094356 A1 | 4/2008 | Ording et al. | |
| 2009/0027353 A1 * | 1/2009 | Im et al. | 345/173 |
| 2009/0288792 A1 | 11/2009 | van Os et al. | |
| 2010/0156798 A1 | 6/2010 | Archer | |
| 2012/0113061 A1 * | 5/2012 | Ikeda | 345/175 |

* cited by examiner

*Primary Examiner* — Quan-Zhen Wang
*Assistant Examiner* — Lin Li
(74) *Attorney, Agent, or Firm* — Larson Newman, LLP

(57) ABSTRACT

An information handling system includes a touch screen, a motion sensor, and a processor. The processor is configured to receive inputs from the touch screen, receive signals from the motion sensor, determine a correlation between the inputs from the touch screen and signals from the motion sensor, and perform an action in response to the correlation. The inputs from the touch screen correspond to a touch contact with the touch screen, and the signals from the motion sensor corresponding to a touch impact to the touch screen.

17 Claims, 4 Drawing Sheets

MOTION SENSOR-ENHANCED TOUCH SCREEN

FIELD OF THE DISCLOSURE

This disclosure generally relates to information handling systems, and more particularly relates to a motion sensor-enhanced touch screen.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
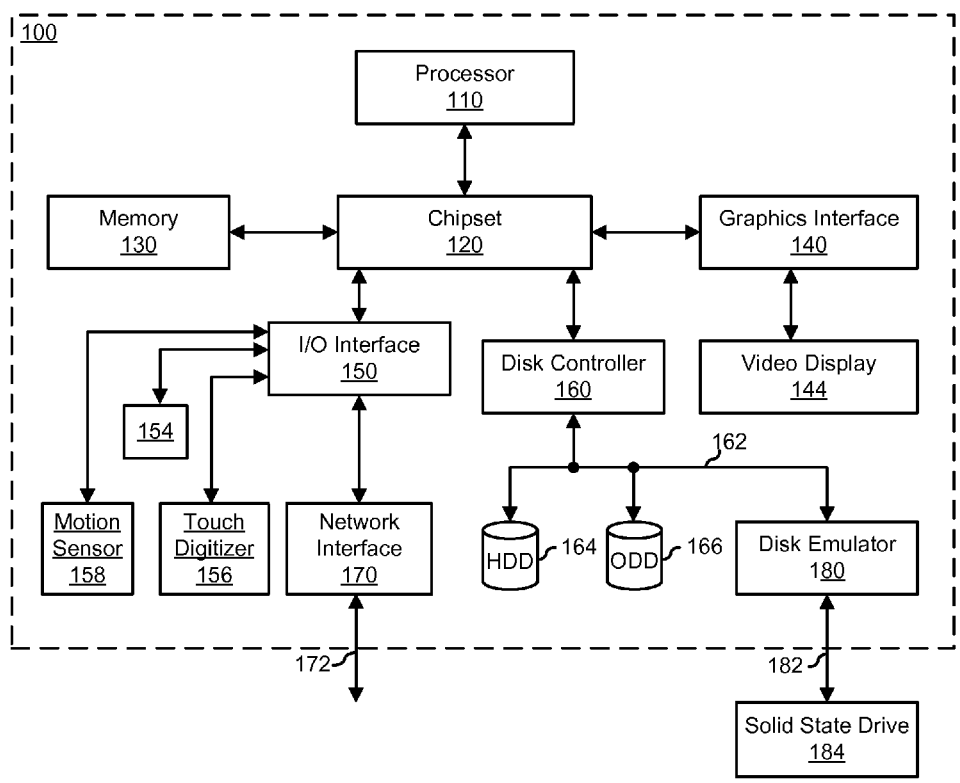
FIG. 1 illustrates a block diagram of an information handling system according to one aspect of the disclosure.

FIG. 1 illustrates a functional block diagram of an embodiment of an information handling system, generally designated as 100. Information handling system 100 includes processor 110, a chipset 120, a memory 130, a graphics interface 140, an input/output (I/O) interface 150, a disk controller 160, a network interface 170, and a disk emulator 180.

Processor 110 is coupled to chipset 120. Chipset 120 supports processor 110, allowing processor 110 to process machine-executable code. In a particular embodiment, information handling system 100 includes one or more additional processors, and chipset 120 supports the multiple processors, allowing for simultaneous processing by each of the processors, permitting the exchange of information between the processors and the other elements of information handling system 100. Processor 110 can be coupled to chipset 120 via a unique channel, or via a bus that shares information between processor 110, chipset 120, and other elements of information handling system 100.

Memory 130 is coupled to chipset 120. Memory 130 can be coupled to chipset 120 via a unique channel, or via a bus that shares information between chipset 120, memory 130, and other elements of information handling system 100. In particular, a bus can share information between processor 110, chipset 120 and memory 130. In a particular embodiment, processor 110 is coupled to memory 130 through a unique channel. In accordance with another aspect, an information handling system can include a separate memory dedicated to each of the processors. A non-limiting example of memory 130 includes static, dynamic, or non-volatile random access memory (SRAM, DRAM, or NVRAM), read only memory (ROM), flash memory, another type of memory, or any combination thereof.

Graphics interface 140 is coupled to chipset 120. Graphics interface 140 can be coupled to chipset 120 via a unique channel, or via a bus that shares information between chipset 120, graphics interface 140, and other elements of information handling system 100. Graphics interface 140 is coupled to a video display 144. Other graphics interfaces can also be used in addition to graphics interface 140 if needed or desired. Video display 144 can include one or more types of video displays, such as a flat panel display or other type of display device.

I/O interface 150 is coupled to chipset 120. I/O interface 150 can be coupled to chipset 120 via a unique channel, or via a bus that shares information between chipset 120, I/O interface 150, and other elements of information handling system 100. Other I/O interfaces can also be used in addition to I/O interface 150 if needed or desired. I/O interface 150 is coupled to one or more add-on resources 154. Add-on resource 154 can also include another data storage system, a graphics interface, a network interface card (NIC), a sound/video processing card, another suitable add-on resource or any combination thereof.

In an embodiment, I/O interface 150 can be coupled to a touch digitizer or sensor 156. Touch sensor 156 can be coupled with the video display 144 to provide a touch screen or may be separate to provide other touch surfaces. Touch sensor 156 can include a resistive touch sensor, a surface acoustic wave touch sensor, a capacitive touch sensor, an infrared touch sensor, a strain gauge touch sensor, an optical imaging touch sensor, a dispersive signal touch sensor, an acoustic pulse recognition touch sensor, or any combination thereof. Additionally, I/O interface 150 can be coupled to a motion sensor 158, such as an accelerometer, a gyroscope, or another suitable motion sensor.

Network interface device 170 is coupled to I/O interface 150. Network interface 170 can be coupled to I/O interface 150 via a unique channel, or via a bus that shares information between I/O interface 150, network interface 170, and other elements of information handling system 100. Other network interfaces can also be used in addition to network interface 170 if needed or desired. Network interface 170 can be a NIC disposed within information handling system 100, on a main circuit board (such as a baseboard, a motherboard, or any combination thereof), integrated onto another component such as chipset 120, in another suitable location, or any combination thereof. Network interface 170 includes a network channel 172 that provide interfaces between information handling system 100 and other devices that are external to information handling system 100. Network interface 170 can also include additional network channels.

Disk controller 160 is coupled to chipset 110. Disk controller 160 can be coupled to chipset 120 via a unique channel, or via a bus that shares information between chipset 120, disk controller 160, and other elements of information handling system 100. Other disk controllers can also be used in addition to disk controller 160 if needed or desired. Disk controller 160 can include a disk interface 162. Disk controller 160 can be coupled to one or more disk drives via disk interface 162. Such disk drives include a hard disk drive (HDD) 164 or an optical disk drive (ODD) 166 (such as a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 160 can be coupled to disk emulator 180. Disk emulator 180 can permit a solid-state drive 184 to be coupled to information handling system 100 via an external interface. The external interface can include industry standard busses (such as USB or IEEE 1384 (Firewire)) or proprietary busses, or any combination thereof. Alternatively, solid-state drive 184 can be disposed within information handling system 100.

In a particular embodiment, HDD 144, ODD 166, solid state drive 184, or a combination thereof include a computer-readable medium in which one or more sets of machine-executable instructions such as software can be embedded. For example, the instructions can embody one or more of the methods or logic as described herein. In a particular embodiment, the instructions reside completely, or at least partially, within memory 130, and/or within processor 110 during execution by information handling system 100. Memory 130 and processor 110 can also include computer-readable media.

Figure 2:
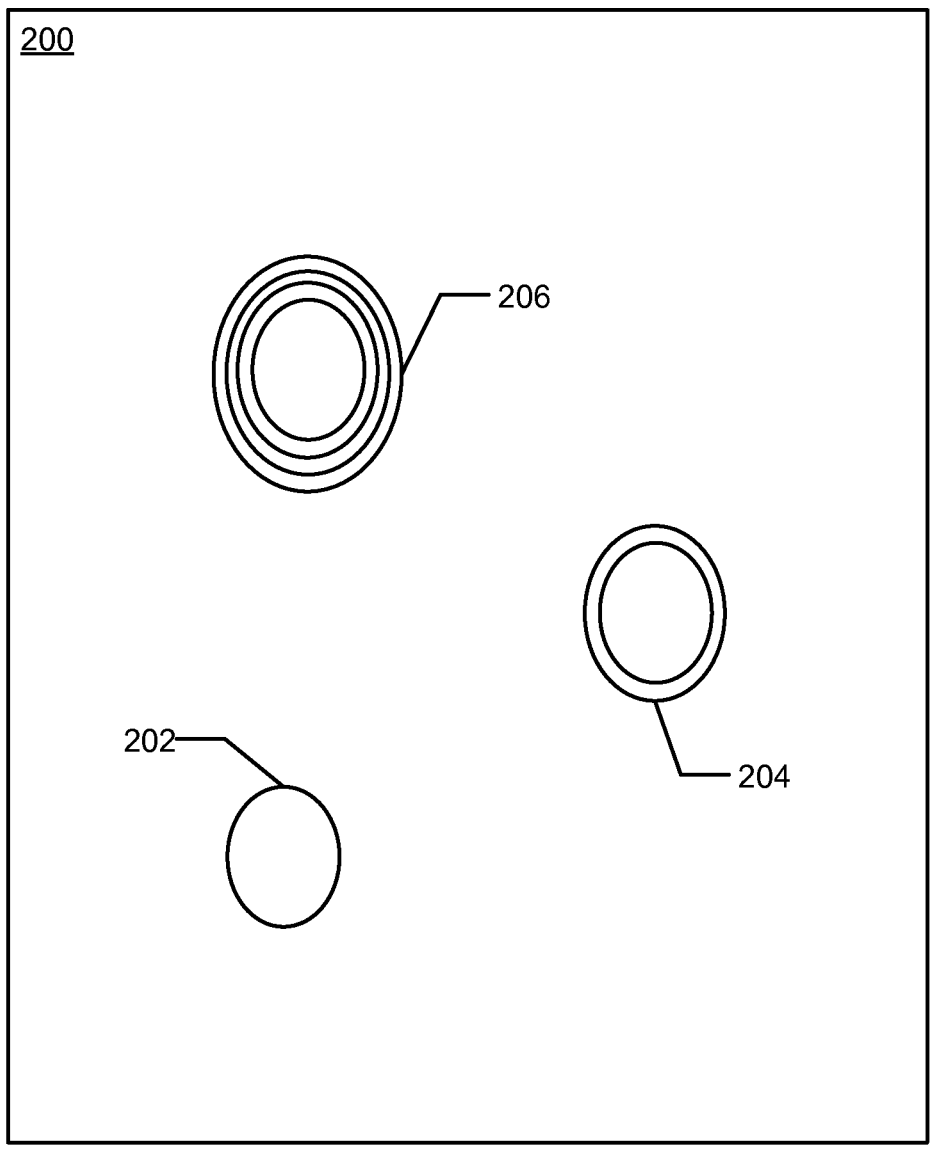
FIG. 2 is a diagram illustrating areas of contact with a touch surface as related to pressure.

FIG. 2 illustrates an exemplary touch surface 200, such as a touch screen. The touch surface may receive touches represented by contact geometries 202, 204, and 206. Touch contact 202 can represent a light touch, such as a finger or other object resting on the touch surface. Touch contact 206 may represent a firm context, such as a finger or other object pressing onto the touch surface and thus producing a greater area of surface contact. Touch contact 204 may represent an intermediate contact, such as a finger or other object pressing gently onto the touch surface. A touch sensor may distinguish among light touch contacts such as touch contact 202, firm touch contacts such as contact 206, and intermediates touch contacts such as contact 204, based on contact geometry. The touch sensor may provide the processor with contact geometry information in addition to a location of the contact.

In an alternate embodiment, the touch sensor may measure the pressure of the contact directly, based on changes to the properties of a pressure sensor within the touch surface. For example, the pressure can be determined based on the magnitude of a change in the resistance or capacitance of the pressure sensor, or even the thickness of the pressure sensor.

In an embodiment, the processor may obtain a user settable sensitivity setting. The user settable sensitivity setting may allow the user to adjust a threshold below which a touch contact is identified as a low pressure or low impact contact. For example, a user with larger fingers may utilize a higher user settable sensitivity setting that a user with smaller fingers, as the larger fingers may produce a larger contact geometry and larger impact magnitude than smaller fingers may produce at the same force or pressure. In a particular example, the user settable sensitivity setting may be adjusted to identify contact 204 as either a low pressure contact or as a high pressure contact.

Figure 3:
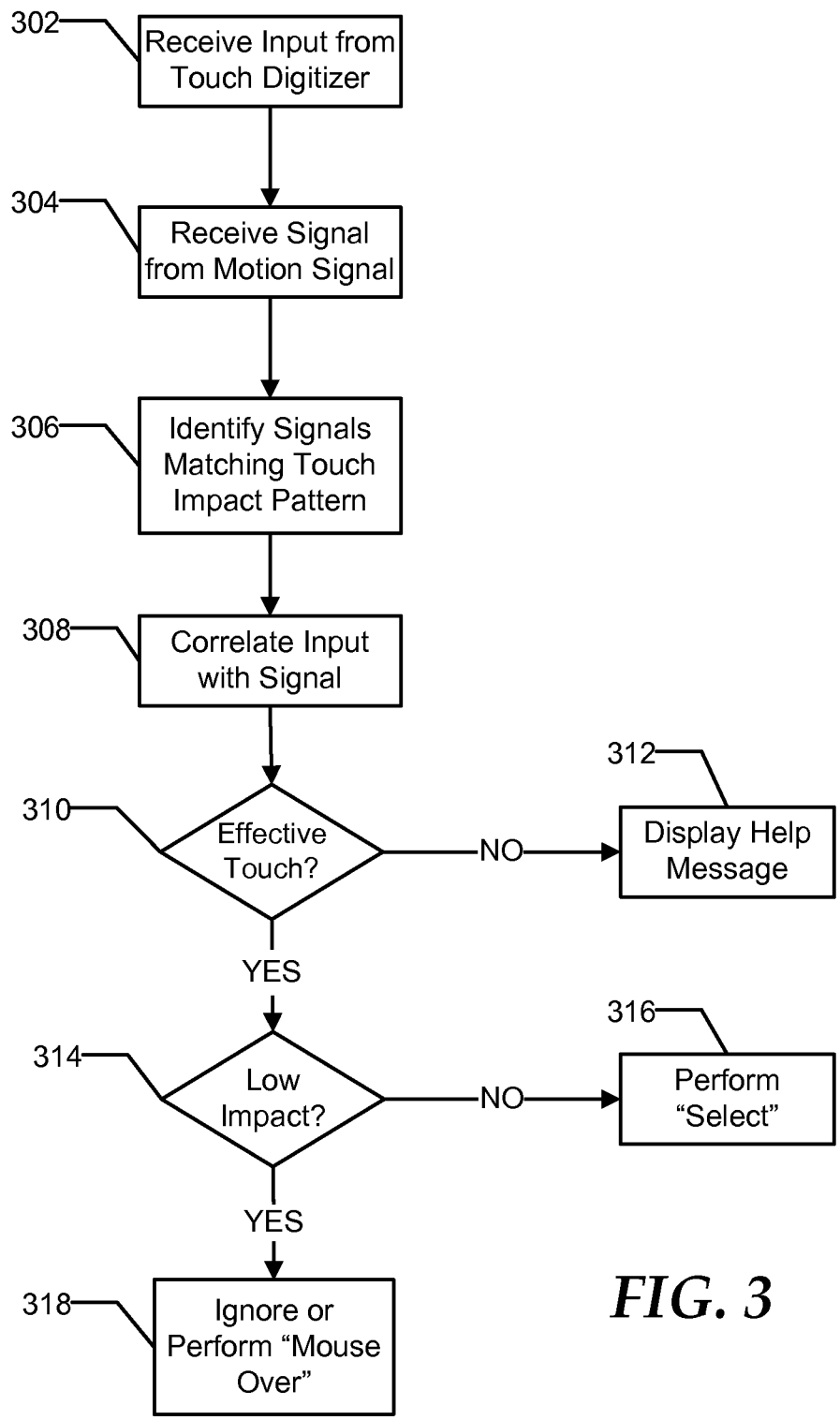
FIG. 3 is a flow diagram illustrating an exemplary method of processing touch inputs.

FIG. 3 illustrates an exemplary method of processing touch inputs. At 302 a processor, such as processor 110, can receive touch inputs from a touch sensor such as touch sensor 156. The touch inputs can correspond to contacts with a touch screen or other touch sensitive surface. Depending on the type of touch screen, the touch inputs can correspond to changes in capacitance, resistance, or other condition, at an area of the touch screen.

At 304, the processor can receive motion signals from a motion sensor, such as motion sensor 158. The motion sensor can include an accelerometer, a gyroscope, or other suitable motion sensor. The motion sensor can have sufficient resolution to distinguish on-screen taps from other impacts and acceleration. Alternatively, the motion sensor can be sensitive to impacts with the touch screen and insensitive to motion of the device or impacts at other portions of the device. The motion signals can correspond to a motion detected by the motion sensor. At 306, the processor can identify motion signals that correspond to impacts with the touch screen, such as would be detected when a user is attempting to use the touch screen.

At 308, the processor can correlate the touch inputs with the motion signals. For example, the touch input can be correlated with a motion signal when the motion signal corresponds to an impact with the touch screen and occurs substantially simultaneously with the touch input. In another example, by correlating the touch inputs with the motion signals, the processor can identify impacts with the touch screen that do not occur with a detected touch input and touch inputs that do not coincide with detected impacts to the touch screen.

At 310, the processor can determine if an effective touch was detected. An effective touch can be detected when a touch input is received by the processor. However, an ineffective touch may be detected as a motion signal that does not occur with a touch input. In an example, an ineffective touch can include a touch to a capacitive touch screen by a stylus or other item that does not cause a change in capacitance of the touch screen. At 312, when an ineffective touch is identified, the processor can cause a help message to be displayed. In an embodiment, the help message can provide guidance to a user regarding the proper use of the touch screen.

Returning to 310, when an effective touch is detected, the processor can determine if the touch was a low impact touch, as shown at 314. A low impact touch can be a light touch that does not cause a motion of the touch screen that is detectable by the motion sensor or when the motion sensor detects a low magnitude touch impact. The processor can identify a low impact touch when a touch input is received that does not correlate with a motion signal or when the motion signal has a low magnitude. When the touch input is not a low impact touch input, the processor can perform a high impact action, such as a select or a key press, as shown at 316.

Returning to 314, when a low impact touch is detected, the processor can perform an action associated with a low impact touch, such as a "mouse over" action, as illustrated at 318. Alternatively, the processor can ignore the low impact touch as an accidental or inadvertent contact with the touch screen. In an embodiment, the processor can choose to perform a low impact action or ignore the touch input depending on the location of the touch input on the touch screen. For example, when the low impact touch is in an area of the touch screen currently displaying a keyboard, the touch input can be ignored as a resting finger. However, when the low impact touch is in an area of the touch screen currently displaying content, the processor can perform the low impact action, such as a "mouse over" action.

Figure 4:
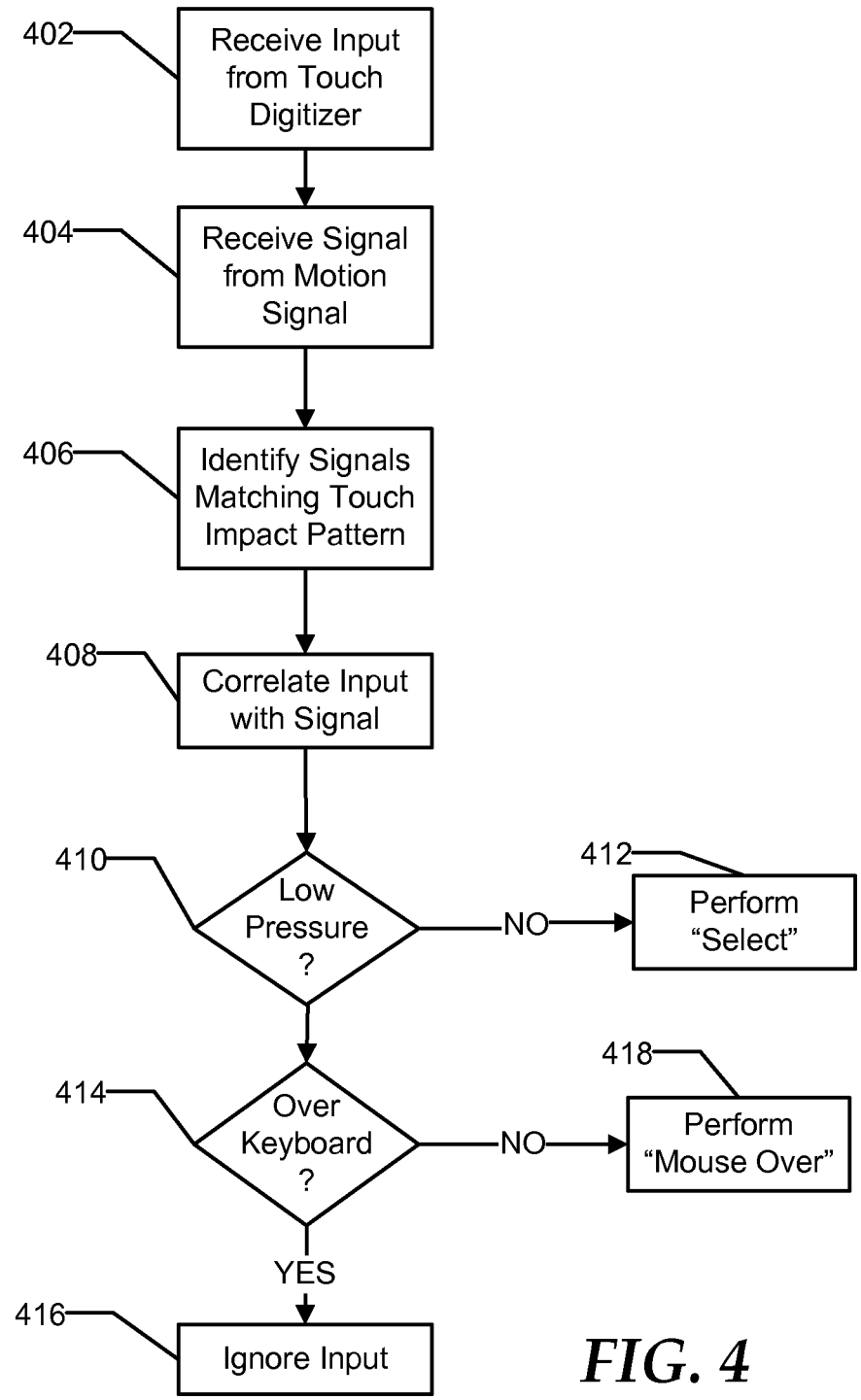
FIG. 4 is a flow diagram illustrating another exemplary method of processing touch inputs; and The use of the same reference symbols in different drawings indicates similar or identical items.

FIG. 4 illustrates another exemplary method of responding to contacts on a touch screen or other touch surface. At 402, a processor, such as processor 110, can receive an input from a touch sensor, such as touch sensor 156. The input from the touch sensor can correspond to contacts with the touch screen. At 404, the processor can receive a motion signal from a motion sensor 158. The motion sensor can include an accelerometer, a gyroscope, or any combination thereof. In a particular embodiment, the motion sensor can have sufficient resolution to distinguish between on-screen taps from other impacts and acceleration.

At 406, the processor can identify touch motion signals that may correspond to a motion caused by an impact with the touch screen or touch surface, such as an impact caused by a tap on the touch screen. The processor may identify the touch motion signals based on characteristics of the motion signals, such as amplitude, magnitude, duration, frequency, and any combination thereof.

At 408, the processor can correlate inputs from the touch sensor with touch motion signals from the motion sensor. In an embodiment, a touch input and a touch motion signal can be correlated based on the time of occurrence. For example, a touch input and a touch motion signal can correspond when they occur at substantially the same time. Additionally, by correlating the touch inputs with the motion signals, the processor can identify impacts with the touch screen that do not occur with a detected touch input and touch inputs that do not correlate with detected impacts to the touch screen.

At 410, the processor can determine if the contact with the touch screen is a low pressure contact. A low pressure contact may be caused by a finger resting on a portion of the touch screen. In contrast, a high pressure contact may be caused by an object, such as a finger, pressing into or tapping the surface of the touch screen. For example, the processor may identify the contact as a low pressure contact when the amplitude of the touch motion signal is small or when no touch motion signal is correlated with the contact. In another example, the processor may assign a pressure to the contact based on the touch geometry of the contact, with a larger geometry receiving a higher pressure value than a smaller geometry.

At 412, when the contact is not a low pressure contact, the processor may perform a select action in response to the contact. Alternatively, when the contact is a low pressure contact, the processor may determine if the low pressure contact corresponds to a touch over a keyboard currently displayed on the touch screen, as illustrated at 414.

When the low pressure contact occurs at a location corresponding to a displayed keyboard, the processor may ignore the contact, as illustrated at 416. For example, a user may rest fingers on the keyboard portion of the screen and may type letters by tapping or pressing the touch screen at locations corresponding to a displayed key. The processor may also use a pattern of contacts as an additional factor in identifying resting finger positions on the keyboard. For example, a pattern of contacts corresponding to typing such as a pattern of periodic single taps in the keyboard section of the display optionally coupled with one or more continuous low pressure contacts may be a further indication that the low pressure contacts are fingers resting on the keyboard.

Alternatively, when the low pressure contact is at a location not corresponding to a displayed keyboard, the processor may perform a "mouse over" action at the point of the low pressure contact, as illustrated at 418. For example, a user may gently press a portion of a screen to expand a menu or other display element, while a firm press or a tap may select a display element, such as an item in the menu.

When referred to as a "device," the embodiments described above can be configured as hardware, or a combination of hardware and software. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could further include software, including firmware embedded at a device, such as a Pentium class or PowerPC™ brand processor, or other such device, or software capable of operating a relevant environment of the information handling system. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In a particular embodiment, an information handling system can be used to function as one or more of the network systems, or carry out one or more of the methods described above. In another embodiment, one or more of the systems described above can be implemented in the form of an information handling system.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a touch screen;
   a touch sensor to detect a surface area of a touch contact on the touch screen, to detect a location of the touch contact on the touch screen, and to measure an amount of pressure of the touch contact with the touch screen based on the surface area of the touch contact;
   a motion sensor that has sufficient resolution to distinguish an impact with the touch screen from other movements of the information handling system; and
   a processor configured to:
      receive a user settable sensitivity setting for a threshold level of a touch contact,
      adjust the threshold level of the touch contact based on the user settable sensitivity setting,
      receive inputs from the touch sensor corresponding to the location of the touch contact on the touch screen and to the surface area of the touch contact on the touch screen,
      receive signals from the motion sensor corresponding to a touch impact to the touch screen, wherein the motion sensor registers the touch impact only in response to an impact with the touch screen and not to other movements of the information handling system,
      determine a correlation between the inputs from the touch screen and the signals from the motion sensor,
      perform an action in response to the correlation, wherein an ineffective touch is determined in response to the correlation indicating a touch impact without a touch contact, and the action includes displaying help information in response to the ineffective touch, and
      in response to the correlation indicating a touch impact with the touch contact, determine a magnitude of the touch impact based on whether a pressure level of the touch contact is above the adjusted threshold level.

2. The information handling system of claim 1, wherein the ineffective touch is determined in response to the correlation indicating a touch contact without a touch impact, and the action includes displaying the help information in response to the ineffective touch.

3. The information handling system of claim 1, wherein the correlation indicates a low magnitude touch impact with a touch contact, and the action includes performing a mouse over action.

4. The information handling system of claim 1, wherein the correlation indicates a high magnitude touch impact with a touch contact, and the action includes performing a selection.

5. The information handling system of claim 1, wherein the motion sensor includes an accelerometer, a gyroscope, or any combination thereof.

6. The information handling system of claim 1, wherein the touch screen is a capacitive touch screen.

7. An information handling system comprising:
   a touch screen;
   a touch sensor to detect a surface area of a touch contact on the touch screen, to detect a location of the touch contact on the touch screen, and to measure an amount of pressure of the touch contact with the touch screen based on the surface area of the touch contact;
   a motion sensor that has sufficient resolution to distinguish an impact with the touch screen from other movements of the information handling system; and
   a processor configured to:
      receive a user settable sensitivity setting for a threshold level of a touch contact;
      adjust the threshold level of the touch contact based on the user settable sensitivity setting;
      receive an input from the touch sensor corresponding to the location of the touch contact on the touch screen and to the surface area of the touch contact on the touch screen;
      receive signals from the motion sensor corresponding to a touch impact to the touch screen, wherein the motion sensor registers the touch impact only in response to an impact with the touch screen and not other movements of the information handling system;
      in response to a touch impact occurring without a touch contact:
         determine an ineffective touch; and
         display help information in response to the ineffective touch; and
      in response to the touch contact occurring substantially simultaneously with a touch impact:
         assign a pressure value to the input;
         select an action based on the pressure value is above the adjusted threshold level; and
         perform the action.

8. The information handling system of claim 7, wherein the pressure value is low, and the action includes performing a mouse over action.

9. The information handling system of claim 7, wherein the pressure value is high, and the action includes performing a selection action.

10. The information handling system of claim 7, wherein the pressure value for the input is based on the touch contact and a magnitude of the signal from the motion sensor.

11. The information handling system of claim 10, wherein the motion sensor includes an accelerometer, a gyroscope, or a combination thereof.

12. The information handling system of claim 7, wherein assigning the pressure value includes determining a touch geometry of the surface area of the touch contact and assigning the pressure value based on the touch geometry.

13. A computer-implemented method comprising:
   receiving a user settable sensitivity setting for a threshold level of a touch contact;
   adjusting the threshold level of the touch contact based on the user settable sensitivity setting;
   obtaining inputs from a touch sensor corresponding to touch contacts with a touch screen, wherein the touch sensor detects a surface area of a touch contact on the touch screen, detects a location of the touch contact on the touch screen, and measures an amount of pressure of a touch contact with the touch screen based on the surface area of the touch contact;
   obtaining signals from a motion sensor corresponding to touch impacts to the touch screen, wherein the motion sensor registers the touch impact only in response to an impact with the touch screen and not other movements of the information handling system, wherein the motion sensor has sufficient resolution to distinguish an impact with the touch screen from other movements of the information handling system;
   determining a correlation between the inputs from the touch sensor and the signals from the motion sensor;

altering the operation of a device based on the correlation, wherein an ineffective touch is determined in response to the correlation indicating a touch impact without a touch contact, and altering the operation of the device includes displaying help information in response to the ineffective touch; and in response to the correlation indicating a touch impact with the touch contact, determining a magnitude of the touch impact based on whether a pressure level of the touch contact is above the adjusted threshold level.

14. The computer-implemented method of claim 13, wherein the ineffective touch is determined in response to the correlation indicating a touch contact without a touch impact, and altering the operation of the device includes displaying the help information.

15. The computer-implemented method of claim 13, wherein the correlation indicates a low magnitude touch impact with a touch contact, and altering the operation of the device includes performing a mouse over action.

16. The computer-implemented method of claim 13, wherein the correlation indicates a high magnitude touch impact with a touch contact, and altering the operation of the device includes performing a click or a selection action.

17. The computer-implemented method of claim 13, wherein the motion sensor includes an accelerometer, a gyroscope, or a combination thereof.

\* \* \* \* \*